United States Patent
Zinner et al.

(10) Patent No.: US 12,113,646 B2
(45) Date of Patent: Oct. 8, 2024

(54) METHOD FOR RAPIDLY FLASHING SENSOR NODES VIA AN ETHERNET NETWORK

(71) Applicant: Continental Automotive Technologies GmbH, Hannover (DE)

(72) Inventors: Helge Zinner, Hannover (DE); Daniel Hopf, Hannover (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/038,120

(22) PCT Filed: Nov. 30, 2021

(86) PCT No.: PCT/DE2021/200227
§ 371 (c)(1),
(2) Date: May 22, 2023

(87) PCT Pub. No.: WO2022/117167
PCT Pub. Date: Jun. 9, 2022

(65) Prior Publication Data
US 2024/0073060 A1    Feb. 29, 2024

(30) Foreign Application Priority Data
Dec. 3, 2020  (DE) .................... 10 2020 215 329.9

(51) Int. Cl.
*G06F 15/173* (2006.01)
*H04L 12/40* (2006.01)

(52) U.S. Cl.
CPC .. *H04L 12/40156* (2013.01); *H04L 12/40019* (2013.01); *H04L 2012/40273* (2013.01)

(58) Field of Classification Search
CPC ......... H04L 12/40156; H04L 12/40019; H04L 2012/40273; H04L 2012/4026
See application file for complete search history.

(56) References Cited

U.S. PATENT DOCUMENTS 8,904,075 B2  12/2014  Milbredt et al.
9,143,348 B2  9/2015   Boeck et al.
(Continued)

FOREIGN PATENT DOCUMENTS

DE  102006003067 A1  7/2007
DE  102011012572 B3  3/2012
(Continued)

OTHER PUBLICATIONS

IEEE Std 802.3ch-2020, IEEE Standard for Ethernet—Amendment 8: Physical Layer Specifications and Management Parameters for 2.5 GB/s, 5 Gb/s, and 10 Gb/s Automotive Electrical Ethernet, Jun. 4, 2020, 207 pages, ISBN 978-1-5044-6770-4, URL: https://ieeexplore.ieee.org/stamp/stamp.jsp?tp=&arnumber=9146430 [retrieved on Jan. 5, 2021].

(Continued)

*Primary Examiner* — John B Walsh
(74) *Attorney, Agent, or Firm* — Buchanan Ingersoll & Rooney PC

(57) ABSTRACT

A method for rapidly flashing sensor nodes via an Ethernet network having a head node and a plurality of associated nodes. The method includes: determining the number of active nodes by a head node; classifying the identified nodes into multiple classifications to prioritize the Ethernet network communication by the head node; receiving reservation requests from at least some of the plurality of nodes by the head node; assigning to one or more nodes in the upcoming communication window time slots in response to reservation requests based on a node priority and the priority assigned to the nodes in accordance with their classification. A necessary download data rate is then determined and, a current bus utilization is ascertained by calculating the time difference of a final beacon and the number of nodes, and the (Continued)

|  | Bus network | Switched network |
|---|---|---|
| No. of PHYs | 4 | 6 |
| Connectors | Fewer connectors with less pins |  |
| Cables | less cabling |  |
| Resources | shared | exclusively | bus cycle of the Ethernet network is optimized in terms of the necessary download data rate.

9 Claims, 9 Drawing Sheets

(56) References Cited

U.S. PATENT DOCUMENTS

| | | | |
|---|---|---|---|
| 9,485,327 | B2 | 11/2016 | Hasse |
| 9,715,471 | B2 | 7/2017 | Hasse |
| 2005/0213503 | A1 | 9/2005 | Guo et al. |
| 2009/0304021 | A1 | 12/2009 | Kraemer et al. |
| 2011/0317584 | A1 | 12/2011 | Wu |
| 2014/0022912 | A1* | 1/2014 | Kim .................. H04L 12/40163 370/244 |
| 2019/0363991 | A1 | 11/2019 | Sostawa et al. |
| 2020/0136993 | A1 | 4/2020 | Yun et al. |
| 2024/0022450 | A1* | 1/2024 | Zinner .................. H04L 47/821 |

FOREIGN PATENT DOCUMENTS

| | | |
|---|---|---|
| DE | 102011085764 A1 | 5/2013 |
| DE | 102013002647 B3 | 5/2014 |
| DE | 102013002648 B3 | 5/2014 |
| JP | 2009-524308 A | 6/2009 |
| JP | 2013-098992 A | 5/2013 |
| JP | 2021-525473 A | 9/2021 |
| KR | 10-2173176 B1 | 11/2020 |
| WO | 2011163074 A1 | 12/2011 |

OTHER PUBLICATIONS

IEEE P802.3cg/D3.4, Sep. 11, 2019, Draft Standard for Ethernet—Amendment 5: Physical Layer Specifications and Management Parameters for 10 Mb/s Operation and Associated Power Delivery over a Single Balanced Pair of Conductors, ISBN 978-1-5044-6134-4, 26 pages.

IEEE Std 802.1AS-2020, IEEE Standard for Local and Metropolitan Area Networks-Timing and Synchronization for Time-Sensitive Applications, Jan. 30, 2020, 421 pages, ISBN 978-1-5044-6430-7, URL: https://ieeexplore.ieee.org/stamp/stamp.jsp?tp=&arnumber=9121845 [retrieved on Jan. 5, 2021].

International Search Report and Written Opinion for International Application No. PCT/DE2021/200227, mailed Apr. 4, 2022, 10 pages.

International Search Report and Written Opinion for International Application No. PCT/DE2021/200227, mailed Apr. 4, 2022, 17 pages (German).

German Search Report for German Application No. 10 2020 215 329.9, dated Jul. 13, 2021 with translation, 14 pages.

Office Action (Notice of Reasons for Refusal) issued Jul. 10, 2024, by the Japan Patent Office in corresponding Japanese Patent Application No. 2023-533897 and an English translation of the Office Action. (8 pages).

* cited by examiner

METHOD FOR RAPIDLY FLASHING SENSOR NODES VIA AN ETHERNET NETWORK

CROSS REFERENCE TO RELATED APPLICATIONS

This application is the U.S. National Phase application of PCT International Application No. PCT/DE2021/200227, filed Nov. 30, 2021, which claims priority to German Patent Application No. 10 2020 215 329.9, filed Dec. 3, 2020, the contents of such applications being incorporated by reference herein.

BACKGROUND OF THE INVENTION

With 10 Mbit/s (IEEE802.3ch), in addition to 100 Mbit/s; 1000 Mbit/s and the ongoing multi-gigabit standardization, another Ethernet standard will be available for automotive applications.

Ethernet and wireless technologies are only now finding their way into automobiles, and their open and standardized protocols make it possible for the first time to also attack the car from the outside. There are increasing reports in the press about attacks on vehicles in which attackers have managed to gain access to the vehicle via radio and have thus also been able to access important vehicle functions.

One variant of the new standard is the CSMA/CD-based MultiDrop mode. This differs significantly from the other Ethernet variants (>10 Mbit/s), since it pursues the aim of being able to design Ethernet more cost-effectively and thus also to address simpler control devices. This standard does not require any switches (switch ICs), but rather is designed as a bus (similar to CAN). This roughly halves the number of required PHYs (transceivers). Ethernet is thus becoming a serious competitor to CAN/CAN-FD and FlexRay, as it is able to significantly reduce system costs. Furthermore, typical automotive interfaces such as SPI instead of xMII are also possible for communication between controllers and physical transceivers (PHYs).

FIG. 1 compares the essential features of Switched Ethernet and the "bus Ethernet" (MultiDrop) as defined in the IEEE standard IEEE P802.3cg. The most important difference here is that the resources, the bus access, are available exclusively with Switched Ethernet, which means that any Ethernet node (ECU) is able to transmit at any time without collisions occurring in the process. A shared medium is used in the new Ethernet bus implementation with MultiDrop mode, that is to say it is necessary to hold off bus access until this resource is available.

The IEEE P802.3cg standard uses, inter alia, a newly defined mechanism (PLCA—Physical Layer Collision Avoidance) to avoid collisions during bus access and to implement fair access. In this case, only precisely one PHY (Physical Transceiver) ever receives access to the bus at any one time. This makes it possible to avoid collisions. Access is based on a what is called a round-robin method. Each ECU (node) on the BUS has the opportunity to transmit once within a defined cycle (or sequence).

What is known as a head node, which takes on the function of a network controller, in this case determines the cycle and transmits recurring "beacons" on the bus. The nodes thus start a timer on the basis of their previously defined identity ID, which determines the order as to when they are allowed to transmit, and, after said timer has expired and it is recognized that they are next, they are allowed to transmit.

FIG. 2 shows the basic sequence of the communication on the Ethernet bus. After the beacon has been transmitted, node 0 is next and, when this has finished its transmission, the next node is allowed to transmit (typically only a single Ethernet frame in each case may be transmitted in the slot).

FIG. 3 illustrates the physical representation of the Ethernet bus with stubs.

EP 2 585 940 A1, incorporated herein by reference, describes that systems and methods for scheduling network communication in a managed network may comprise a network controller that recognizes multiple network nodes; the network controller classifies the recognized network nodes into two or more classifications of nodes in order to prioritize network communication at the node level; the network controller, which receives reservation requests from at least some of the multiplicity of network nodes, wherein the reservation requests request one or more time slots for their respective network nodes in an upcoming communication window; and the network controller allocates time slots in the upcoming communication window to one or more network nodes in response to reservation requests, wherein the allocation is based on a priority of the network nodes and wherein the priority is allocated to the nodes in accordance with their classification. That patent application describes that a network controller creates a cyclic media access plan (MAP) in which the access operations of the network nodes are defined in each cycle. The basis is the required quality of service, the reservation requests from the respective nodes and their priority/lower priority, from which the network controller creates the MAP. The network controller may also automatically send MAP messages without reservation requests.

In U.S. Pat. No. 2,005,213 503 A1, incorporated herein by reference, in accordance with certain described implementations, a coordinating device performs bandwidth allocation procedures based on information from previously unsatisfied bandwidth allocation requests and responds to current bandwidth allocation requests. The current bandwidth allocation requests specify the currently requested bandwidth amounts for multiple streams, and the current bandwidth allocation requests may be received from multiple entities with multiple streams. The information from previously unsatisfied bandwidth allocation requests is taken into consideration when allocating the available bandwidth between multiple streams or multiple entities for the currently requested bandwidth amounts. When planning the bus access of the network nodes, the 'unserved' access reservation from the previous cycle is also taken into consideration by the head node.

In contrast to a switched network (as with 100/1000 etc. Mbit/s), with 10 Mbit/s, as described, the bus cannot be accessed immediately, but it is necessary to wait for the respective time. Compared to other Ethernet types, the 10 Mbit bus offers a significantly lower data rate, which is why special consideration has to be given here to efficiency of the data transmission and the latency of the transmission (or rather also the access time). If security also becomes part of the 10 Mbit/s system, then there is hardly any remaining data rate for payload data (similarly to current CAN-FD implementations).

Flashing, i.e. renewing software, providing new functions, eliminating errors, of control devices is not really a new topic for the automotive industry, but will nevertheless become much more important in the coming years due to the new mobile communications standard 5G. Over Ethernet (100 Mbit/s, 1000 Mbit/s, etc.), flashing also poses no problems whatsoever, since on the one hand sufficient bandwidth and on the other exclusive access is available (point-to-point full-duplex connections).

With the new 10 Mbit/s MultiDrop bus, new challenges have to be addressed that were not considered in the cross-industry standard. This is because parallel transmission and reception is not possible with this bus, and with this bus each node may only transmit one frame per transmission cycle. There are currently no solutions for efficient flashing, or here the actual time for downloading software or a diagnostic query, of the subscribers on the bus. The remaining data rate with approximately 8 nodes will typically only be between 1 and 2 Mbit/s.

The problem nowadays is that the standard allows only one frame to be transmitted per cycle, and thus the remaining data rate for the respective node (here specifically the master node or head node) decreases as the number of subscribers on the bus increases.

The head node will be implemented either in a head unit, a gateway, a fusion unit or generally in a zone controller, that is to say usually on the same control device from which updates or diagnostic queries also emanate.

It is known to use what is known as a burst mode, in which nodes are able to send at most 255 packets during their cycle, but this mode needs to be statically preconfigured and maintained.

In semi-automated and highly automated driving, there are increasing demands on the vehicle that require hard real-time support from the transmission network and the protocols, as is already the case nowadays in aircraft or industrial automation.

SUMMARY OF THE INVENTION

An aspect of the invention is an optimization of the flash time, especially the time of the download, of a software or a diagnostic query of sensors or other control devices.

An aspect of the invention advantageously adapts the new Ethernet technologies in terms of costs and implementation effort for use in motor vehicles.

An aspect of the invention proposes a method that adapts the bus cycle to the data rate requirements of the head node. This means that more bandwidth may be dynamically allocated to the head node as needed. An aspect of the invention proposes a method that, depending on the size of the data to be transmitted, adapts the bus cycle such that the download/update requirements on the transmission time are not infringed. The method in this case calculates how much bandwidth has to be provided at what time. However, the method in the process always takes the standard into consideration and does not have to intervene on the other nodes.

The proposal solves the problem that the beacon cycle time depends only on the bus and its configuration, but not on the individual node or its requirements. The fundamental revolution of the new architectures is characterized by the centering of the software on fewer and fewer computing units. These so-called servers or central computers no longer consist of just one μC or μP but contain several μC, μP, SOC and also Ethernet switches with a large number of ports—they represent their own local network with individual software in each case (this also means that the respective software components do not (cannot) know that they are communicating with components located in the same housing, for example).

Zone architectures with central servers are known. Here, on the one hand, the server contains many powerful processors and, on the other hand, a lot of software or applications are executed on it. The communication effort within the control device is enormous (this represents its own local network). The entire software of the vehicle will be executed here in the future and each controller has its own software stack which is provided by different suppliers.

Concepts in order to transfer (dynamically) functions and applications to other control devices/processors, i.e. also in order to optimize them, are known. This is referred to as live migration, reallocation or migration. The series application for the transfer of software to other ECUs/processors is known.

By virtue of the new architectures, now for the first time there are possibilities for implementing software on different ECUs as well, since the hardware is becoming more generalized and the software less dependent on the platform, wherein before now this was not possible with all functions and ECUs. Therefore, what software will run on what control device (server) is not always definite at the time when the system is designed. The shift in software is not limited here to ECU-to-ECU operations, however, but applies even more to controller-to-controller operations within the same ECU.

Advantageously, an aspect of the invention can significantly optimize and shorten the flash time and thus, for example, the download of software from control devices. The concept may be implemented without additional financial expenditure, such as hardware costs, and while complying with the standard. The use of the newly introduced Ethernet protocol in motor vehicles necessitates mechanisms that make use of simple techniques and given properties of technologies in order to be able to do without expensive implementations and further additional hardware. The network system according to an aspect of the invention is improved in terms of reliability.

The advantage of the application-specific determination of a more accurate and predictable delay is in an improvement in the scheduling and execution of communication in the vehicle. This means that existing bus systems are able to be used more efficiently and the jump to expensive technology (higher bandwidth) is able to be avoided. This can also have an impact on buffer storage that is required, which can then be dispensed with (or is made smaller). Fusions of different data (for example ultrasound+radar or microphones) may thereby be improved and made more accurate. Furthermore, the logging of data can be made even more precise.

An aspect of the invention sets forth methods that allow software to be designed more flexibly and make the best of the underlying system without having to program it permanently into software beforehand. An aspect of the invention permits software developers and software architects to provide software/applications that may be tailored to the requirements of the application case more flexibly and precisely. Incorporating the cited methods into software allows optimization to take place in each case within a control device. This means that software may be developed in a more platform-independent manner.

An aspect of the invention offers the advantage that software can be flashed approximately 8× faster than is possible with the prior art in the 10 Mbit/s Ethernet bus system. This means that memory can be dimensioned smaller or memory can be released to other applications.

If it is a software update, then a more realistic time window can be reported back through an aspect of the invention and the worst case does not have to be assumed. Thus, downloads/updates are possible that would otherwise never be started or would be started later.

The new technologies may no longer be held back in motor vehicles. Protocols such as IP, AVB and TSN have thousands of pages of specifications and test suites. It is not an immediate given that these new protocols are controllable in automobiles.

An advantage of an aspect of the invention is that the usual hardware does not have to be changed, but rather the existing hardware can continue to be used. The new method can be integrated into an existing network without damaging existing devices. A standard to be observed is not infringed since the existing protocol may be used.

The use of the method according to an aspect of the invention can be used in other industrial fields that use 10 Mbit/s Ethernet, such as in industrial automation.

An aspect of the invention is advantageously achieved by a method for rapidly flashing sensor nodes via an Ethernet network having a head node and a plurality of associated nodes, wherein the method comprises:
a) determining the number of active nodes by means of a head node;
b) classifying the identified nodes in two or more classifications of node to prioritize the Ethernet network communication by means of the head node,
c) receiving reservation requests from at least some of the plurality of nodes by means of the head node,
d) assigning to one or more nodes in the upcoming communication window time slots in response to reservation requests, wherein the assignments are based on a node priority and the priority is assigned to the nodes in accordance with their classification, and wherein, after the number of active nodes has been determined, a necessary download data rate is determined and a current bus utilization is ascertained, wherein the bus utilization is ascertained by calculating the time difference of a final beacon and the number of nodes, and the bus cycle of the Ethernet network is optimized in terms of the necessary download data rate.

In an advantageous embodiment of the method, the bus utilization is monitored continuously.

A further advantageous embodiment of the method is characterized in that, once the necessary download data rate has been determined, a currently free data rate in the Ethernet network in the last bus cycle ($D_{frei}$) of the Ethernet network is determined and a necessary data rate per bus cycle ($D_{zus}$) is determined, wherein, if the free data rate in the Ethernet network in the last bus cycle ($D_{frei}$) of the Ethernet network is greater than or equal to the necessary data rate per bus cycle ($D_{zus}$), no change is made in the next bus cycle, and if the free data rate in the Ethernet network in the last bus cycle ($D_{frei}$) of the Ethernet network is less than the necessary data rate per bus cycle, a change is made in the next bus cycle.

Particularly advantageous is the implementation by a control unit for an Ethernet network, which control unit is in the form of a first node as control unit, to send a signal to a second control unit of the Ethernet onboard network and to receive the signal from the second control unit; to determine a delay time of the signal on a connecting path to the second control unit; to determine a maximum speed of the connecting path on the basis of the delay time; and to determine a type of a transmission medium of the connecting path on the basis of the maximum speed, the control unit at least comprising a microprocessor, a volatile memory and nonvolatile memory, at least two communication interfaces, a synchronizable timer, the nonvolatile memory containing program instructions that, when executed by the microprocessor, allow at least one embodiment of the method according to the invention to be implemented and executed.

Particularly advantageous is implementation by an Ethernet network for a motor vehicle, having a first control unit and a second control unit, wherein the control units are connected to one another via at least one connecting path, and the first control unit is designed to carry out the method according to an aspect of the invention.

A particularly advantageous embodiment of the Ethernet onboard network is distinguished in that the Ethernet network comprises a third control unit, which is connected to the first control unit only indirectly and is connected to the second control unit directly by way of a third connecting path, wherein the third control unit is designed to determine a delay time of a third signal on the third connecting path, wherein the first control unit is designed to trigger the determination of the delay time of the third signal by way of a service message to the third control unit.

By implementing the methods disclosed by an aspect of the invention, platform-independent software with higher quality and durability can be used. An aspect of the invention can be employed in other communication systems with clock synchronization components and embedded systems.

BRIEF DESCRIPTION OF THE DRAWINGS

An exemplary embodiment of the invention is depicted in the drawings and will be described in greater detail below. In the drawings.

DETAILED DESCRIPTION OF EXEMPLARY EMBODIMENTS

Figure 1:
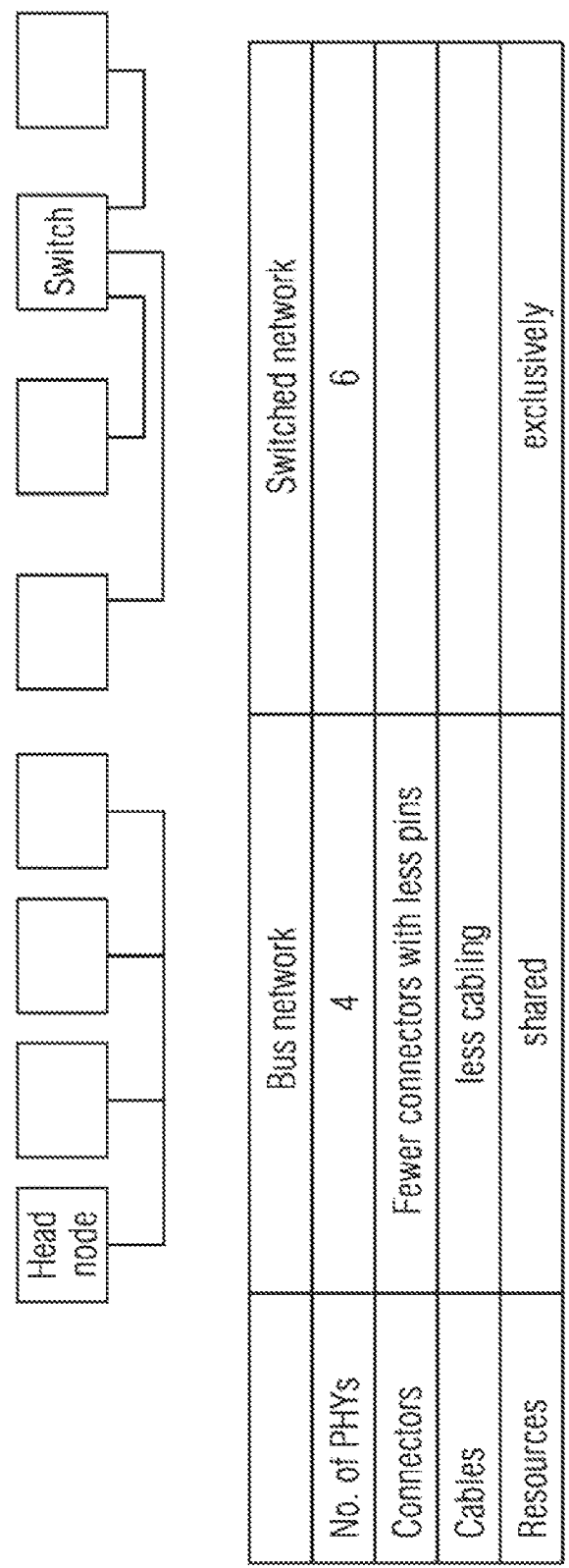
FIG. 1 shows a simplified illustration of the differences between an Ethernet bus (10 Mbit/s) and a switched network.

FIG. 1 shows a simplified illustration of the differences between an Ethernet bus (10 Mbit/s) and a switched network.

Figure 2:
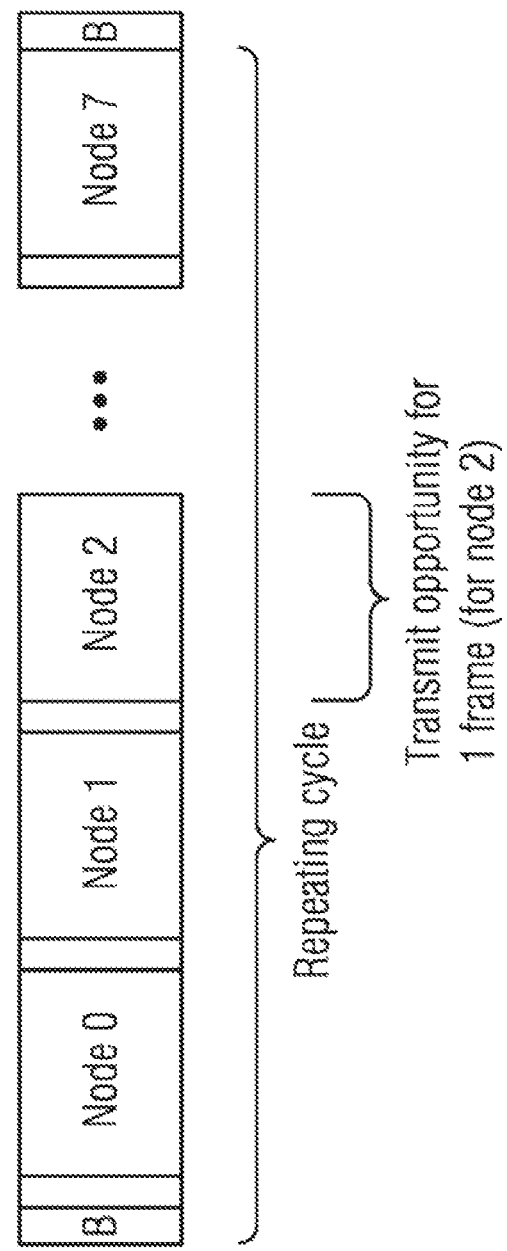
FIG. 2 shows a basic communication flow on the Ethernet bus.

FIG. 2 illustrates the basic communication flow on the Ethernet network bus. When the beacon is sent out, it is first the turn of node 0, and, when it has finished its transmission, the next node may transmit. Typically, only a single Ethernet frame may be transmitted in the slot in each case.

Figure 3:
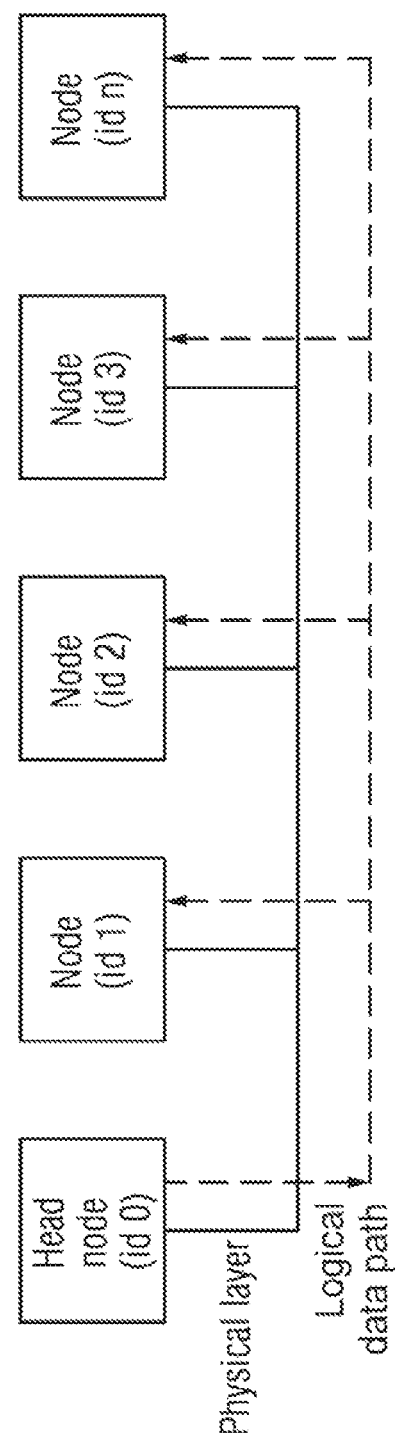
FIG. 3 shows a physical representation of the Ethernet bus with stubs.

FIG. 3 is the component-based representation of the Ethernet bus with stubs.

Figure 4:
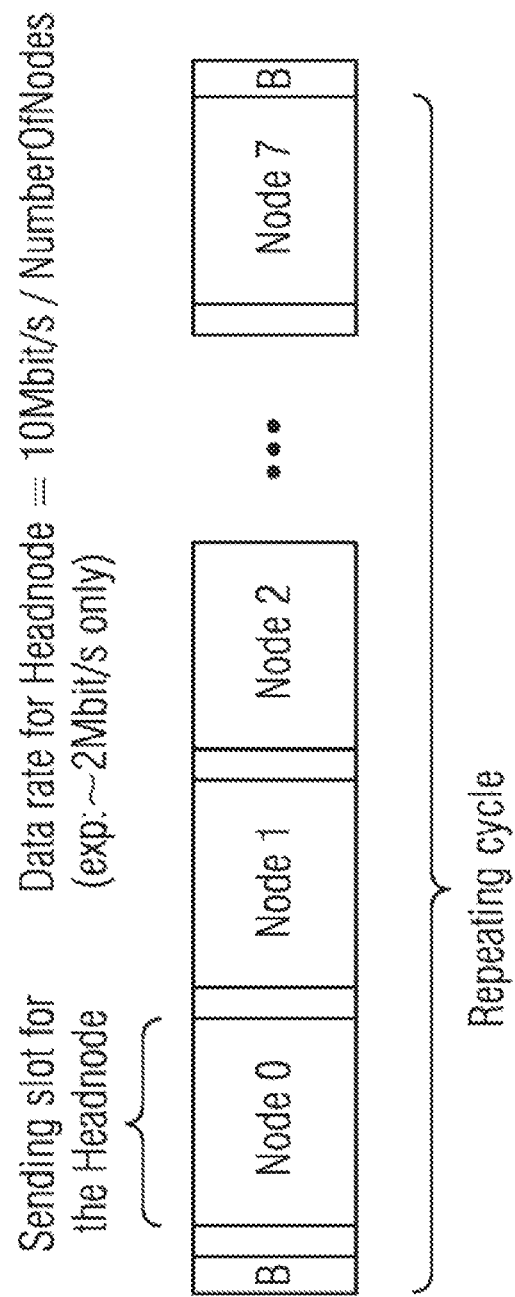
FIG. 4 shows the simplified illustration of the problem according to an aspect of the invention.

FIG. 4 shows the simplified representation of an aspect of the invention.

Figure 5:
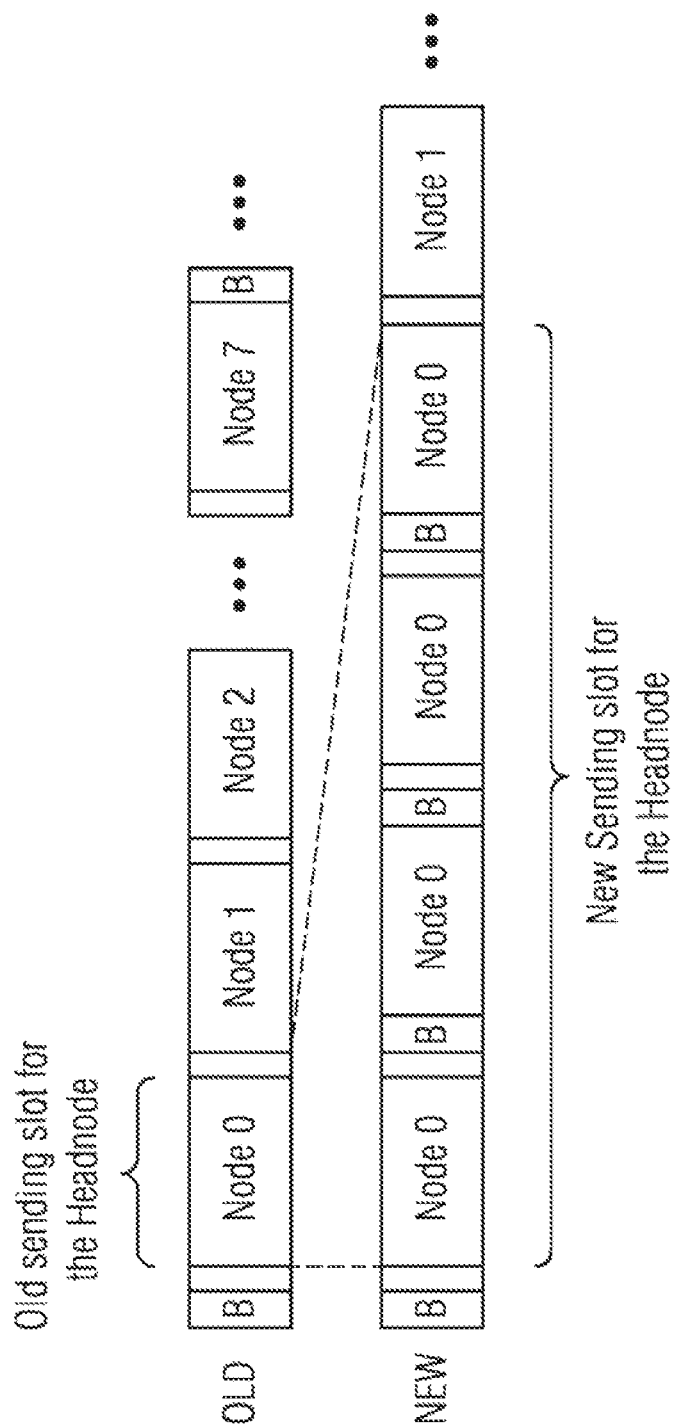
FIG. 5 shows the general solution of an aspect of the invention by a dynamically changing beacon cycle time.

In FIG. 5, the general solution of an aspect of the invention is shown by a dynamically changing beacon cycle time, wherein the beacon signals are shown as 'B'. An aspect of the invention proposes a new method to optimize the efficiency of data transmission on the automotive 10 Mbit/s bus and to reduce the bus access time for the head node. The idea of an aspect of the invention describes the adaptations of the Ethernet network bus cycle. Unlike FlexRay, this has no negative or ill-considered effects. The nodes do not have a fixed, definite time window, but only follow a transmission order based on pre-configured unique node IDs.

Figure 6:
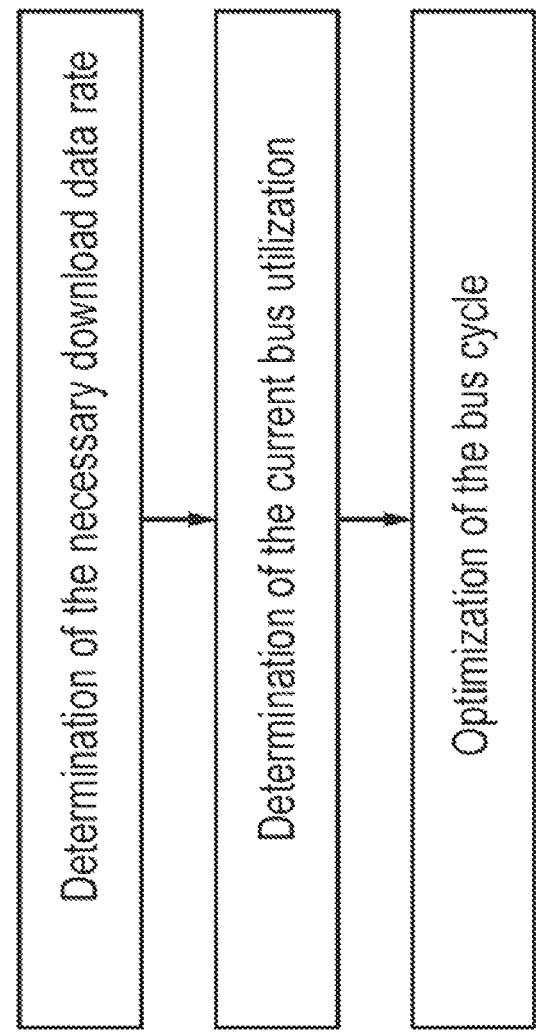
FIG. 6 shows the optimization of the beacon cycle time to the bandwidth requirements of the head node.

FIG. 6 shows the basis on which the bus cycle is optimized. First of all, the head node determines which data must be transmitted in which time unit. This can be the size of a file or the duration of a stream. Taking into account the overhead in the data transmission (e.g. Ethernet header), the absolute data rate on the bus is determined in this way.

To avoid useless optimization or adaptation of the bus cycle, the method proposes determining the current bus utilization. The current utilization can be determined by the time difference of the last beacons and the number of participating nodes. If the bus utilization is low, it can be statistically assumed that it will not increase abruptly towards the next cycle. However, it is still possible to react to any changes, as it is proposed to monitor the bus utilization continuously.

In the last step, the bus cycle is adapted in respect of the required data rate. Two possibilities will be proposed later for this.

Figure 7:
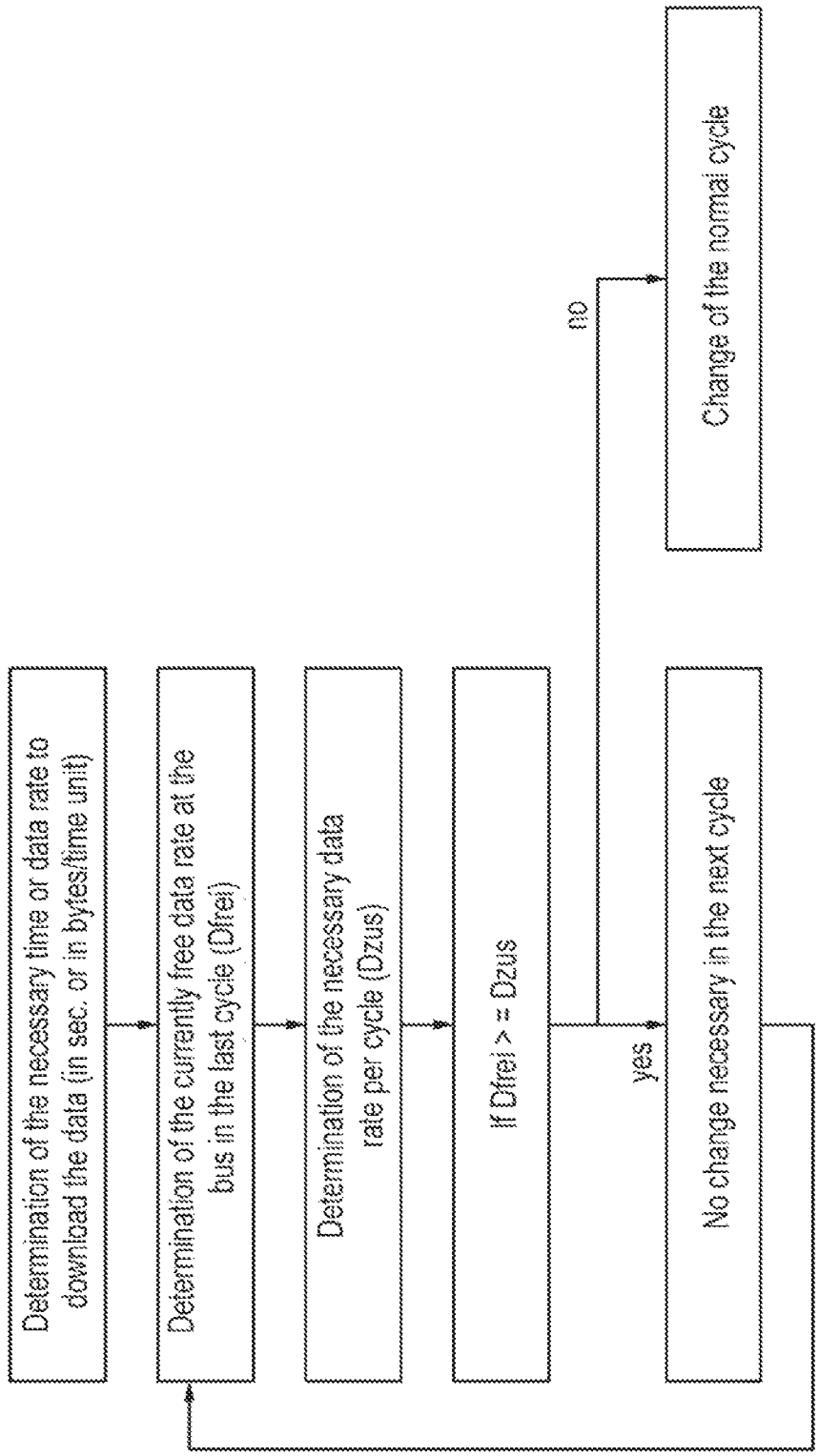
FIG. 7 shows an embodiment of the simple cycle optimization.

FIG. 7 shows a partial step of the method, in which the necessary data rate is compared with the current bus capacity. First, the necessary download data rate is calculated in relation to the 10 Mbit bus. Then the number of active nodes is determined by the head node. The slots of the inactive subscribers, either only passively listening, in error state, or in sleep mode, are determined and are to be made available by the method for the head node, which is called $D_{frei}$.

This already results in an optimization of the bus without actively interfering with the ongoing communication or without muting nodes. The real data rate can then also be reported back to the application without always having to assume the worst case. This saves memory and gives the application, possibly also the driver, a real time window back. This method is the first step towards optimizing the cycle.

Another possible optimization step is described, to prevent a subset (or also all) of the other subscribers on the bus (except of course the head node) from transmitting, based on the calculated, necessary data rate at the head node, and thus to reduce the cycle time for the purpose of download (or security update), so that the head node can serve its necessary data rate, even if, according to normal bus operation, there would not be enough bandwidth available. For this purpose the amount of data the head node would still have to send in the current cycle is constantly compared, wherein this value is taken as a limit value, which must not fall below 0 in this cycle and wherefore the cycle would be terminated before by the transmission of the next beacon. This method results in the highest possible fairness towards the other bus subscribers, because, only within certain tolerances, as much bandwidth as needed is used for the head node and the rest is still available for use by the following nodes. The number of nodes that can still send in a cycle due to this remaining bandwidth cannot be predicted exactly, since each bus subscriber can be between 0 (sends no data at all), 64 (sends a minimum Ethernet frame) and 1522 bytes (sends a maximum Ethernet frame).

To further increase fairness, it is suggested that, in the event that a node can no longer transmit and the cycle is terminated by the next beacon (because the remaining required data rate in that slot falls below a potential maximum Ethernet frame), the "remaining bandwidth" is carried over into the next cycle and released for use by the other bus subscribers in the next cycle. In this way, a kind of "credit" can be built up despite the bandwidth requirement at the head node being met.

However, to prevent the credit from increasing too much and thus potentially causing large data bursts in which many of the other bus subscribers can send large amounts of data unhindered, it is also proposed to limit the increase in the credit, either in terms of time by saturating or resetting the credit after a configurable period of time in seconds, or by a cycle counter when saturating or resetting the credit after a configurable number of bus cycles.

Figure 8:
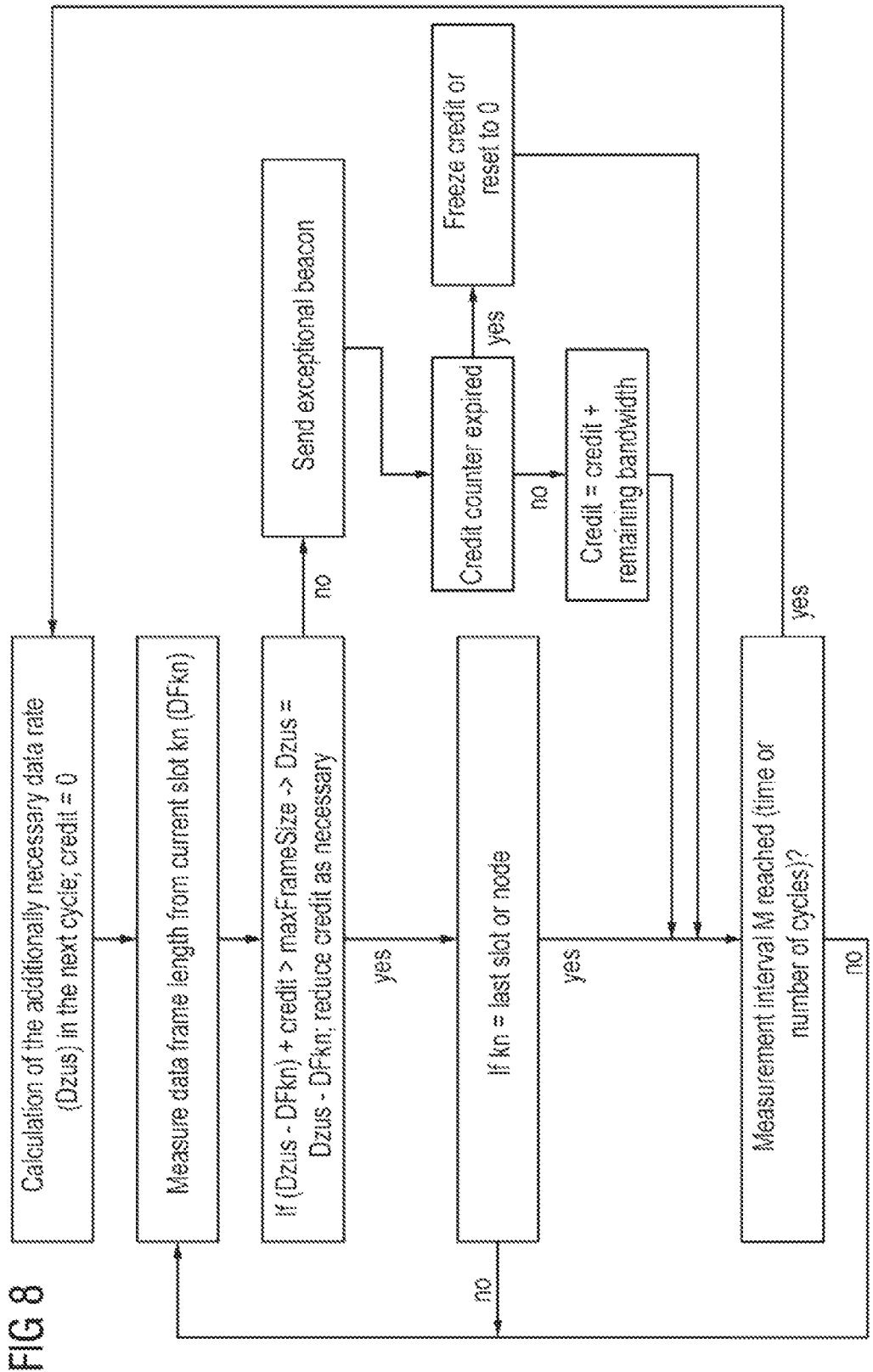
FIG. 8 shows an embodiment of the extended, fair cycle optimization.

The sequence of this extended, fairer cycle optimization is shown in FIG. 8. This type of cycle optimization is not the only conceivable one. An intermediate solution between "no fairness", as in FIG. 7, and "greatest possible fairness", as in FIG. 8, could be a simpler method, for example, in which only the head node is allowed to transmit over several cycles and a large credit builds up accordingly quickly. After a certain threshold value, this can then be reduced in one go by then inserting a cycle in which all nodes are given the opportunity to transmit before they have to "sit out" again for a certain number of cycles. If desired, in order to simplify the method, this variant can also be implemented without any consideration of credits, but simply according to the number of cycles—for example "99 cycles only head node transmits, then 1 cycle all nodes". In this case, however, a certain jitter (variance) in the data rate of the head node cannot be excluded.

Figure 9:
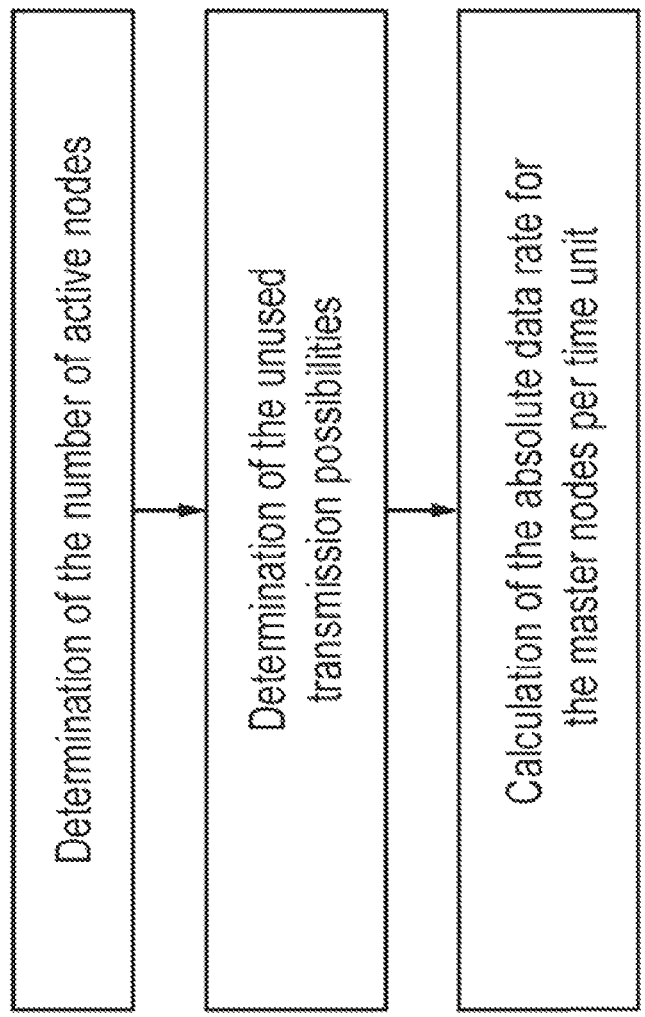
FIG. 9 shows an alternative for calculating the download data rate.

FIG. 9 shows further alternative method steps by means of which, after determining the number of active nodes, the unused transmission possibilities are determined and hereby the absolute data rate for the head node is calculated per time unit.

In the following, an aspect of the invention proposes for the already presented method to determine the trustworthiness of a communication partner or its application. Provided that this trustworthiness is determined, the exchange of sensitive data can be carried out.

FIG. 3 also schematically shows a detail of an overall system architecture in which an ECU (server) can be connected to further sensors and ECUs and components outside the vehicle. The head nodes on the server, for example, are typically connected on the PCB (printed circuit board) via MII (Media Independent Interface) or PCI Express and thus can always manage without transceivers (PHYs).

An Ethernet transceiver (PHY) causes a delay in the 3-digit nanosecond range. This sounds small, but the delay on layer 2 (MAC) is approximately in the 1-digit nanosecond range or tends towards 0—depending on how high the resolution of the measurement is.

The method first of all determines the address of the application by means of which data are to be exchanged (received, sent or both).

The method then starts a delay-time measurement for this component. For example, the PDelay_Request method of the gPTP protocol (or 802.1AS) can be used here. Two responses are sent back in response, and hardware timestamps can be used to determine the delay time of the message. The use of a protocol with hardware timestamps-NTP, for example, is thus ruled out because the resolution is too imprecise.

With the help of this calculated value, the method calculates the physical distance to this subscriber. The distance is not directly expressed here by a unit of measurement such as meters or centimeters, but can be converted to the number of components (PHYs, switches) that are part of the connection, since this delay is significant in contrast to the delay on the actual cable.

The method measures the delay time to a subscriber/address by starting delay-time measurements (for example part of the PTP protocol) and by calculating therefrom the distance to this subscriber.

The measured delay time must first be evaluated in order to provide an indication of the location. The software cannot know whether a partner is located within the same ECU or not, or ideally it must not know if a generalized SW and not a special version is used; in addition, IP addresses can be falsified or changed. The delay time of an MII-based connection does not need PHYs (transceivers). However, neither the time synchronization software nor the actual application commissioning this investigation knows this. A PHY converts the data into electrical signals and encodes them, which takes much more time than when two Ethernet MACs communicate with each other over the MII-based lines.

The method presented recognizes whether a subscriber is directly connected to the requesting subscriber. If this is not the case, the appropriate protocol can then be selected depending on the latency. For example, MAC-Sec or IP-Sec could be used for latencies that apply within the vehicle, and other IP/TCP-based methods could be used if the latency is so high and the subscriber is undoubtedly outside the vehicle.

The invention claimed is:

1. A method for rapidly flashing sensor nodes via an Ethernet network having a head node and a plurality of associated nodes, wherein the method comprises:
    a) determining the number of active nodes by a head node;
    b) classifying the identified nodes in two or more classifications of node to prioritize the Ethernet network communication by the head node;
    c) receiving reservation requests from at least some of the plurality of nodes by the head node; and
    d) assigning to one or more nodes in the upcoming communication window time slots in response to reservation requests, wherein the assignments are based on a node priority and the priority is assigned to the nodes in accordance with their classification,
    wherein, after the number of active nodes has been determined, a necessary download data rate is determined and a current bus utilization is ascertained, wherein the bus utilization is ascertained by calculating the time difference of a final beacon and the number of nodes, and the bus cycle of the Ethernet network is optimized in terms of the necessary download data rate.

2. The method as claimed in claim 1, wherein the bus utilization is monitored continuously.

3. The method as claimed in claim 1, wherein, once the necessary download data rate has been determined, a currently free data rate in the Ethernet network in the last bus cycle of the Ethernet network is determined and a necessary data rate per bus cycle is determined, wherein, if the free data rate in the Ethernet network in the last bus cycle of the Ethernet network is greater than or equal to the necessary data rate per bus cycle, no change is made in the next bus cycle, and if the free data rate in the Ethernet network in the last bus cycle of the Ethernet network is less than the necessary data rate per bus cycle, a change is made in the next bus cycle.

4. A control unit for an Ethernet network, the control unit, as first node, being designed as a control unit:
    to transmit a signal to a second control unit of the Ethernet on-board network and to receive the signal from the second control unit;
    to determine a delay time of the signal on a connecting path to the second control unit;
    to determine a maximum speed of the connecting path on the basis of the delay time; and
    to determine a type of a transmission medium of the connecting path on the basis of the maximum speed,
    the control unit at least comprising:
    a microprocessor,
    a volatile memory and nonvolatile memory,
    at least two communication interfaces,
    a synchronizable timer, and
    the nonvolatile memory containing program instructions which, when run by the microprocessor, allow at least one embodiment of the method as claimed in claim 1 to be implemented and executed.

5. An Ethernet network for a motor vehicle, having a first control unit and a second control unit, wherein the control units are connected to one another by way of at least one connecting path, and the first control unit is in a form as claimed in claim 4.

6. The Ethernet onboard network as claimed in claim 5, wherein
    the Ethernet network comprises a third control unit, which is connected to the first control unit only indirectly and is connected to the second control unit directly by way of a third connecting path, wherein the third control unit is designed to determine a delay time of a third signal on the third connecting path, wherein the first control unit is designed to trigger the determination of the delay time of the third signal by way of a service message to the third control unit.

7. A computer program product comprising instructions that, when the program is executed by a computer, cause said computer to perform the method as claimed in claim 1.

8. A non-transitory computer-readable medium on which the computer program product as claimed in claim 7 is stored.

9. A vehicle having multiple control units as claimed in claim 4, comprising an Ethernet onboard network.

* * * * *